United States Patent
Hu et al.

(10) Patent No.: US 9,614,771 B2
(45) Date of Patent: *Apr. 4, 2017

(54) METHOD, APPARATUS, AND SYSTEM FOR CONTROLLING SERVICES

(71) Applicant: HUAWEI TECHNOLOGIES CO., LTD., Shenzhen, Guangdong (CN)

(72) Inventors: Yusheng Hu, Beijing (CN); Weihua Qiao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

This patent is subject to a terminal disclaimer.

(21) Appl. No.: 14/556,580

(22) Filed: Dec. 1, 2014

(65) Prior Publication Data

US 2015/0085662 A1 Mar. 26, 2015

Related U.S. Application Data

(63) Continuation of application No. 13/923,776, filed on Jun. 21, 2013, now Pat. No. 8,923,879, which is a (Continued)

(30) Foreign Application Priority Data

Dec. 21, 2010 (CN) .......................... 2010 1 0613170

(51) Int. Cl.
  *H04W 72/00* (2009.01)
  *H04L 12/851* (2013.01)
  (Continued)

(52) U.S. Cl.
  CPC ...... *H04L 47/2425* (2013.01); *H04L 12/1407* (2013.01); *H04L 12/1489* (2013.01);
  (Continued)

(58) Field of Classification Search
  CPC ...... H04W 24/00; H04W 28/04; H04W 28/18
  (Continued)

(56) References Cited

U.S. PATENT DOCUMENTS 8,189,474 B2 5/2012 Venkataraman et al.
8,923,879 B2 * 12/2014 Hu ...................... H04L 12/1407
    455/406
(Continued)

FOREIGN PATENT DOCUMENTS

CN   1874239    12/2006
CN   101159971   4/2008
(Continued)

OTHER PUBLICATIONS

Extended European Search Report dated Apr. 2, 2014 in corresponding European Patent Application No. 11850664.1.
(Continued)

*Primary Examiner* — Nghi H Ly
(74) *Attorney, Agent, or Firm* — Staas & Halsey LLP (57) ABSTRACT

A method, an apparatus, and a system control services, where the method includes: receiving, by a PCRF, congestion state information on a cell, resource-related information on the cell, and subscriber-related information on a UE in an activated state in the cell that are sent by an access network device; generating, by the PCRF, a QoS policy and/or a charging policy for the UE in the activated state in the cell according to the congestion state information on the cell, the resource-related information on the cell, and the subscriber-related information on the UE in the activated state in the cell; sending, by the PCRF, the generated QoS policy and/or charging policy to a PCEF, so as to enable the PCEF to execute the QoS policy and/or the charging policy.

15 Claims, 7 Drawing Sheets

Related U.S. Application Data continuation of application No. PCT/CN2011/083662, filed on Dec. 8, 2011.

(51) Int. Cl.

| | | |
|---|---|---|
| *H04L 12/14* | (2006.01) | |
| *H04L 12/24* | (2006.01) | |
| *H04W 28/24* | (2009.01) | |
| *H04M 15/00* | (2006.01) | |
| *H04W 72/04* | (2009.01) | |
| *H04L 12/26* | (2006.01) | |
| *H04W 28/08* | (2009.01) | |

(52) U.S. Cl.
CPC ........ *H04L 41/5025* (2013.01); *H04L 43/062* (2013.01); *H04M 15/61* (2013.01); *H04M 15/66* (2013.01); *H04M 15/8027* (2013.01); *H04W 28/24* (2013.01); *H04W 72/0486* (2013.01); *H04W 28/08* (2013.01)

(58) Field of Classification Search
USPC .................. 455/452.2, 450, 406, 422.1, 453
See application file for complete search history.

(56) References Cited

U.S. PATENT DOCUMENTS

| | | |
|---|---|---|
| 2005/0041584 A1 | 2/2005 | Lau et al. |
| 2006/0268716 A1 | 11/2006 | Wijting et al. |
| 2007/0087756 A1 | 4/2007 | Hoffberg |
| 2008/0010379 A1 | 1/2008 | Zhao |

FOREIGN PATENT DOCUMENTS

| | | |
|---|---|---|
| CN | 101204043 | 6/2008 |
| CN | 101547133 | 9/2009 |
| CN | 101711041 | 5/2010 |
| CN | 102075898 | 5/2011 |
| EP | 1887740 | 2/2008 |
| EP | 2512176 | 10/2012 |
| EP | 2645764 | 10/2013 |
| JP | 2010-278884 | 12/2010 |
| JP | 2013-530557 | 7/2013 |
| JP | 2013-540380 | 10/2013 |
| WO | WO2010/049002 | 5/2010 |
| WO | WO2011/126941 | 10/2011 |
| WO | WO2012/021320 | 2/2012 |

OTHER PUBLICATIONS

"3$^{rd}$ Generation Partnership Project; Technical Specification Group Core Network and Terminals; Policy and Charging Control over Rx reference point (Release 9)", 3GPP TS 29.214, V9.2.0, Dec. 2009, pp. 1-44.

Notice of Allowance, dated Sep. 2, 2014, in U.S. Appl. No. 13/923,776 (9 pp.).

Notice of Reasons for Rejection, dated Jun. 3, 2014, in corresponding Japanese Application No. 2013-545023 (5 pp.).

3rd Generation Partnership Project; Technical Specification Group Core Network and Terminals; Policy and Charging Control over Rx reference point (Release 9), 3GPP TS 23.214 V9.2.0, Dec. 2009, pp. 1-44.

Extended European Search Report, dated Apr. 2, 2014, in corresponding European Application No. 11850664.1 (8 pp.).

PCT International Search Report and Written Opinion of the International Searching Authority mailed Mar. 15, 2012 in corresponding International Application No. PCT/CN2011/083662.

Chinese Office Action mailed Jan. 17, 2013 in corresponding Chinese Application No. 201010613170.9.

3$^{rd}$ Generation Partnership Project; Technical Specification Group Services and System Aspects; Policy and Charging Control Architecture (Release 10), 3GPP TS 23.203 V10.1.0, Sep. 2010, pp. 1-132.

3$^{rd}$ Generation Partnership Project; Technical Specification Group Core Network and Terminals; Policy and Charging Control over Gx Reference Point (Release 10), 3GPP TS 29.212 V10.0.0, Sep. 2010, pp. 1-121.

International Search Report, dated Mar. 15, 2012, in corresponding International Application No. PCT/CN2011/083662 (6 pp.).

U.S. Appl. No. 13/923,776, filed Jun. 21, 2013, Yusheng Hu et al., Huawei Technologies Co., Ltd.

Japanese Notice of Allowance dated Oct. 4, 2016 in corresponding Japanese Patent Application No. 2015-133283.

\* cited by examiner

METHOD, APPARATUS, AND SYSTEM FOR CONTROLLING SERVICES

CROSS-REFERENCE TO RELATED APPLICATIONS

This application is a continuation of U.S. patent application Ser. No. 13/923,776, filed on Jun. 21, 2013, which is a continuation of International Application No. PCT/CN2011/083662, filed on Dec. 8, 2011, The International Application claims priority to Chinese Patent Application No. 201010613170.9 filed on Dec. 21, 2010. The afore-mentioned patent applications are hereby incorporated by reference in their entireties.

TECHNICAL FIELD

Embodiments of the present invention relate to the field of communications technologies, and in particular, to a method, an apparatus, and a system for controlling services.

BACKGROUND

The communications network is evolving from a circuit switching (Circuit Switching, CS for short) domain network to an IP-based packet switching (Packet Switching, PS for short) domain network. To provide carrier-class services in an IP network, a key issue is how to address the end-to-end quality of service (Quality of Service, QoS for short) problem to meet the communication quality requirements of users (especially for real-time services, such as video calls). In addition, because more types of services can be provided in IP communication networks (such as web browsing, file downloading, and video on demand), networks need to possess capabilities of charging according to different service streams.

To meet these requirements, the 3rd generation partnership project (3rd Generation Partnership Project, 3GPP for short) defines a policy and charging control (Policy and Charging Control, PCC for short) architecture, in which the PCC architecture includes a policy control and charging rules function entity (Policy Control and Charging Rules Function, PCRF for short). The function entity determines a PCC rule according to restrictions of accessing a network by subscribers, policies of carriers, subscribers subscription data, and information on services currently provided to subscribers, and sends the PCC rules to a policy and charging enforcement function entity (Policy and Charging Enforcement Function, PCEF for short), and then the PCEF executes the PCC rules. The PCC rules include a detection rule of a service data stream, whether to perform gating, QoS corresponding to a service data stream, and a stream-based charging rule (such as charging based on time, traffic, and events). The PCEF implements, by executing the PCC rules sent by the PCRF, the detection and measurement of service data streams, QoS assurance for service data streams, traffic processing on the user plane, and triggering of session management on the control plane.

In the existing PCC architecture, the PCEF and PCRF can only subscribe to location information on a single user equipment (User Equipment, UE for short). The PCRF determines the PCC rules of the UE only according to the location information and subscription information on the UE, resulting in that only services of the UE is assured, but services of other UEs in an activated state in the same cell cannot be assured, and therefore wireless resources cannot be fully utilized.

SUMMARY

Embodiments of the present invention provide a method, an apparatus, and a system for controlling services, so as to implement the control over services of all UEs in a cell to fully utilize wireless resources of the cell.

An embodiment of the present invention provides a method for controlling services, including:

obtaining, by a PCRF, congestion state information on a cell, the resource-related information on the cell, and the subscriber-related information on a UE in an activated state in the cell that are sent by access network devices;

generating, by the PCRF, a QoS policy and/or a charging policy for the UE in the activated state in the cell according to the congestion state information on the cell, the resource-related information on the cell, and the subscriber-related information on the UE in the activated state in the cell; and sending, by the PCRF, the QoS policy and/or the charging policy to the PCEF, so as to enable the PCEF to execute the QoS policy and/or the charging policy.

An embodiment of the present invention further provides an apparatus for controlling services, including:

an obtaining module, configured to obtain congestion state information on a cell, the resource-related information on the cell, and the subscriber-related information on a UE in an activated state in the cell that are sent by access network devices;

a decision module, configured to generate a QoS policy and/or a charging policy for the UE in the activated state in the cell according to the congestion state information on the cell, the resource-related information on the cell, and the subscriber-related information on the UE in the activated state in the cell; and a sending module, configured to send the QoS policy and/or the charging policy to a PCEF, so as to enable the PCEF to execute the QoS policy and/or the charging policy.

An embodiment of the present invention further provides a system for controlling services, including an access network device and a PCRF, where:

the access network device is configured to send congestion state information on a cell, resource-related information on the cell, and subscriber-related information on a UE in an activated state in the cell to a PCRF; and the PCRF is configured to receive the congestion state information on the cell, the resource-related information on the cell, and the subscriber-related information on the UE in the activated state in the cell that are sent by the access network device; generate a QoS policy and/or charging policy for the UE in the activated state in the cell according to the congestion state information on the cell, the resource-related information on the cell, and the subscriber-related information on the UE in the activated state in the cell; and send the generated QoS policy and/or charging policy to a PCEF, so as to enable the PCEF to receive and execute the QoS policy and/or the charging policy sent by the PCRF.

According to the foregoing technical solutions, in the embodiments of the present invention, by obtaining the congestion state information on the cell, the resource-related information on the cell, and the subscriber-related information on a UE in the activated state in the cell that are sent by the access network device, the PCRF can generate the QoS policy and/or the charging policy for the UE in the activated state in the cell according to the obtained information and send the QoS policy and/or the charging policy to the PCEF, so as to enable the PCEF to execute the QoS policy and/or the charging policy, thereby implementing the control over services of all UEs in the activated state in the cell.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the aspects, technical solutions, and advantages of the embodiments of the present invention more clearly, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art according to the embodiments of the present invention without creative efforts shall fall within the protection scope of the present invention.

Figure 1:
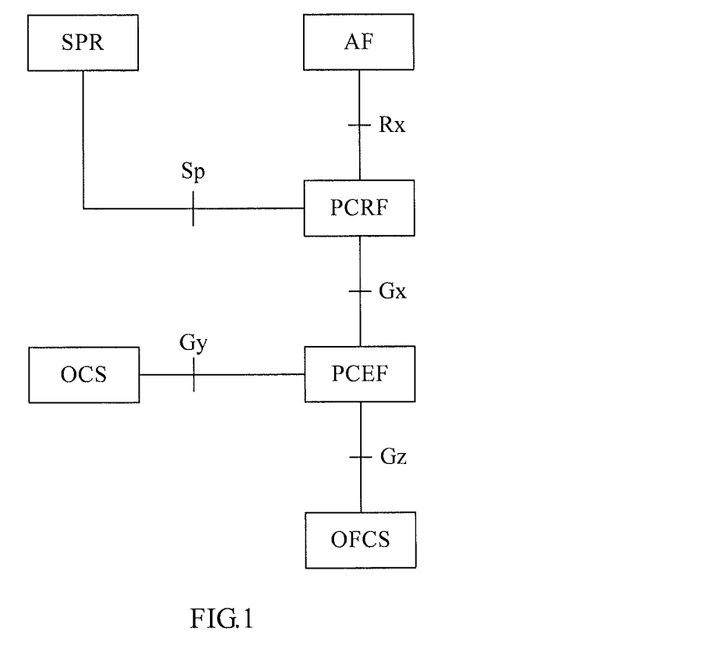
FIG. 1 is a schematic diagram of a PCC architecture defined by the 3GPP.
Figure 2:
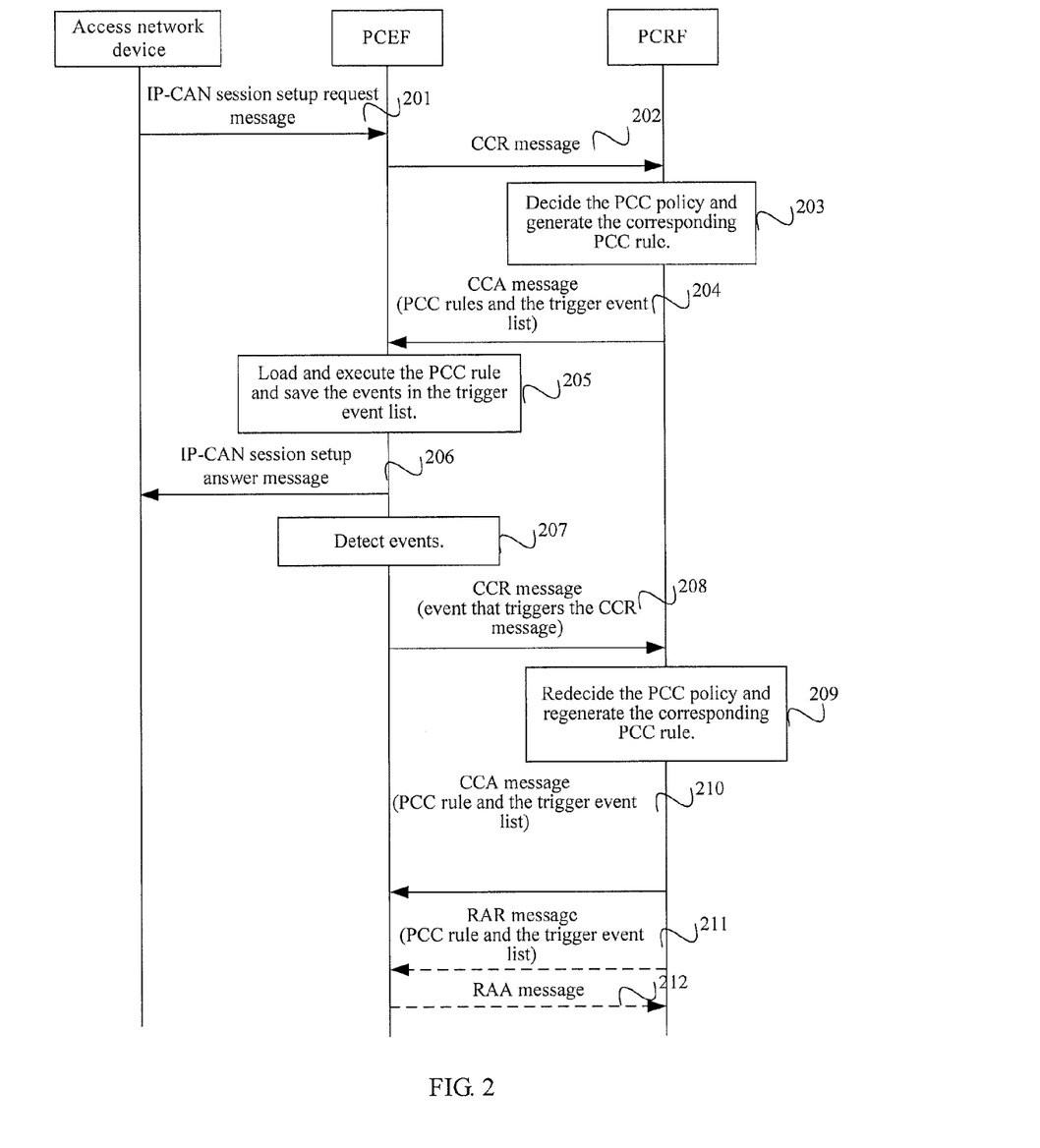
FIG. 2 is a schematic flowchart of information exchange between a PCRF and a PCEF in a PCC architecture.

FIG. 1 is a schematic diagram of a PCC architecture defined by the 3GPP. As shown in FIG. 1, in the PCC architecture, different service streams may be detected on a network side, and QoS control and charging statistical collection are performed according to the service streams. In the PCC architecture shown in FIG. 1, a flowchart of information exchange between a PCRF and a PCEF is shown in FIG. 2, and the information exchange between the PCRF and the PCEF includes the following steps:

Step 201: An access network device sends an IP connectivity access network (IP Connectivity Access Network, IP CAN for short) session setup request message to a PCEF. The format of the IP-CAN session setup request message is related to an access network type. For example, for a GPRS network, a first PDP context is set up.

Step 202: The PCEF sends a credit control request (Credit-Control-Request, CCR for short) message to a PCRF, in which the CCR message includes information such as the UE identification information and IP address.

Step 203: The PCRF makes a PCC policy decision to generate a corresponding PCC rule, according to the information included in the received CCR message, restrictions of accessing a network by the UE, a policy of a carrier, subscriber subscription data, and information on services currently provided to the UE.

Optionally, the PCRF may further determine a trigger event list (for example: an event such as a location change of the UE).

Step 204: The PCRF sends a credit control answer (Credit-Control-Answer, CCA for short) message to the PCEF, in which the CCA message includes the generated PCC rule.

Optionally, the CCA message may further include the determined trigger event list.

Step 205: The PCEF loads and executes the PCC rule and saves events in the trigger event list.

Step 206: The PCEF sends an IP-CAN session setup answer message to the access network device.

Step 207: The PCEF detects an event according to the events in the trigger event list sent by the PCRF.

Step 208: When the PCEF detects that an event is generated, the PCEF sends a CCR message to the PCRF, in which the CCR message includes the event that triggers the CCR message.

Optionally, the CCR message includes related information on the event.

Step 209: The PCRF re-makes the PCC policy decision to re-generate the corresponding PCC rule.

Optionally, the PCRF may further re-determine the trigger event list.

Step 210: The PCRF sends a CCA message to the PCEF, in which the CCA message includes the re-generated PCC rule.

Optionally, the CCA message may further include the re-determined trigger event list.

Step 211: Alternatively, the PCRF may also actively send the PCC rule and the trigger event list to the PCEF using a Re-Auth-Request (Re-Auth-Request, RAR for short) message.

Step 212: The PCEF loads and executes the PCC rule included in the Re-Auth-Request (Re-Auth-Request, RAR for short) message; the PCEF loads and executes the PCC rules; if the trigger event list is included in the RAR message, the PCEF saves the trigger event list and sends an RAA message as a response.

Therefore, in the foregoing PCC architecture, the PCEF and the PCRF can only send location information on a single UE or subscribe to the location change of a single UE; when a UE's location changes, the PCEF reports the current location information of the UE to the PCRF for PCRF to decide a policy.

Figure 3:
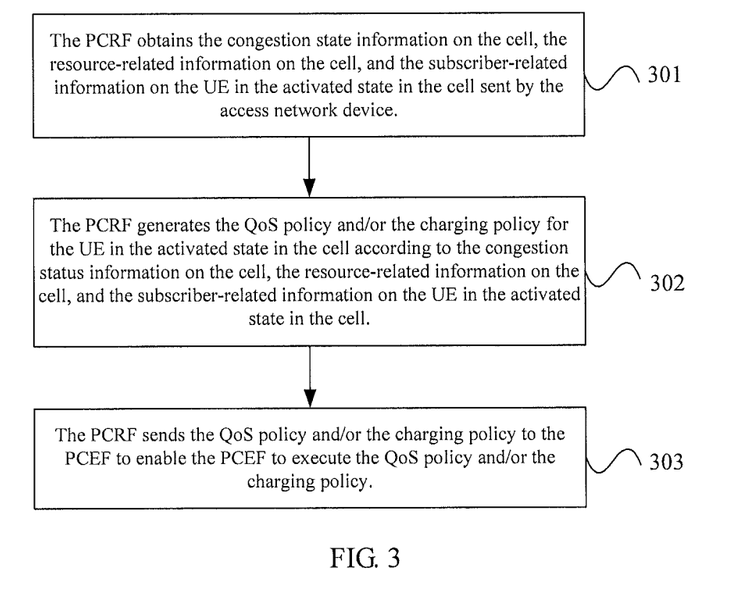
FIG. 3 is a schematic flowchart of a method for controlling services according to Embodiment 1 of the present invention.

FIG. 3 is a schematic flowchart of a method for controlling services according to Embodiment 1 of the present invention. As shown in FIG. 3, the method for controlling services in this embodiment may include the following steps:

Step 301: A PCRF obtains congestion state information on a cell, resource-related information on the cell, and subscriber-related information on a UE in an activated state in the cell that are sent by an access network device.

The congestion state information may include cell congestion indication information or related information on a congestion event of the cell; the resource-related information on the cell may include but is not limited to a maximum data service bandwidth that the cell can support and/or the maximum number of UEs that the cell can serve; the subscriber-related information on the UE in the activated state in the cell may include but is not limited to subscriber list information on the UE in the activated state in the cell, in which the subscriber list information on the UE in the activated state in the cell includes UE identification information.

Step 302: The PCRF generates a QoS policy and/or a charging policy for the UE in the activated state in the cell according to the congestion state information on the cell, the resource-related information on the cell, and the subscriber-related information on the UE in the activated state in the cell.

Step 303: The PCRF sends the QoS policy and/or the charging policy to a PCEF, so as to enable the PCEF to execute the QoS policy and/or charging policy.

Furthermore, if a bearer binding and event reporting function entity (Bearer Binding and Event Reporting Function, BBERF for short) exists in a network, the PCRF may further send the QoS policy to the BBERF, so as to enable the BBERF to execute the QoS policy.

The method for controlling services provided in this embodiment may be applied to a plurality of types of wireless access networks, such as a Universal Mobile Telecommunications System (Universal Mobile Telecommunication System, UMTS for short), an Evolved Universal Mobile Telecommunication System Territorial Radio Access Network (Evolved Universal Mobile Telecommunication System Territorial Radio Access Network, E-UTRAN for short), a UMTS Territorial Radio Access Network (UMTS Territorial Radio Access Network, UTRAN for short), a Global System for Mobile Communications (Global System for Mobile Communications, GSM for short)/Enhanced Data rates for GSM Evolution (Enhanced Data rate for GSM Evolution, EDGE for short), a GSM EDGE Radio Access Network (GSM EDGE Radio Access Network, GERAN for short), and a non-third generation partnership project (the 3rd Generation Partner Project, 3GPP for short) network.

The PCEF may be specifically located in a gateway device. Specifically, the gateway device may be a packet data network gateway (Packet Data Network Gateway, P-GW for short) in an E-UTRAN, a gateway general packet radio service (General Packet Radio Service, GPRS for short) supporting node (Gateway GPRS Supporting Node, GGSN for short) in a UTRAN/GERAN, or other network elements.

The BBERF may be specifically located in a gateway device. Specifically, the gateway device may be a serving gateway (Serving Gateway, S-GW for short) in an E-UTRAN or a trusted non-3GPP access gateway (Trusted non-3GPP Access Gateway) in a non-3GPP network.

The access network device may be an evolved NodeB (Evolved NodeB, eNB for short) in an E-UTRAN, a radio network controller (Radio Network Controller, RNC for short) or base station controller (Base Station Controller, BSC for short) in a UTRAN/GERAN, an access network logical function of an ePDG of a WLAN in a non-3GPP network, an access service network base station (Access Service Network Base Station, ASN BS for short) in a WiMAX network, or an access network logical function of an HRPD AN in a CDMA network, or other network elements.

In step 301, specifically, the obtaining congestion state information on a cell may be: obtaining the cell congestion indication information or the related information on the congestion event of the cell that is sent by the access network device, so as to obtain the congestion state information on the cell that the foregoing information indicates.

Specifically, the congestion state information on the cell may indicate congestion state information on the cell and non-congestion state information on the cell; or only indicate the congestion state information on the cell, and when the congestion state information on the cell is received, the state information indicating that congestion occurs in the cell is obtained, that is, if no congestion state information on the cell is received, it indicates that no congestion occurs in the cell.

In step 301, specifically, the obtaining resource-related information on the cell may be: receiving the resource-related information on the cell that is sent by the access network device, so as to obtain the resource-related information on the cell.

In step 301, specifically, the obtaining subscriber-related information on the UE in an activated state in the cell may be: receiving subscriber list information on the UE in the activated state in the cell that is sent by the access network device, so as to obtain the subscriber-related information on the UE in the activated state in the cell. If the number of UEs in the activated state in the cell changes, that is, at least one type of the following conditions may be included: a UE in the activated state that changes from a deactivated state to the activated state exists in the cell, a UE in the deactivated state that changes from the activated state to the deactivated state exists in the cell, a UE in the activated state leaves the cell, and a UE in the activated state enters the cell, the subscriber-related information on the UE in the activated state in the cell may further include at least one of the following types of information: identification information on the UE in the activated state that changes from the deactivated state to the activated state in the cell, identification information on the UE in the deactivated state that changes from the activated state to the deactivated state in the cell, identification information on the UE in the activated state that leaves the cell, and identification information on the UE in the activated state that enters the cell.

Specifically, the access network device detects the cell congestion state according to signaling for detecting the cell congestion state sent by the PCRF, and sends cell congestion indication information of the cell to the PCRF, so as to enable the PCRF to obtain the congestion state information on the cell or the non-congestion state information on the cell according to the cell congestion indication information; or when the access network device detects that the cell is congested, the access network device sends the cell congestion indication information to the PCRF, so as to enable the PCRF to obtain the congestion state information on the cell according to the cell congestion indication information.

Specifically, the access network device may query cell resources according to signaling for querying the cell resources sent by the PCRF, and send the resource-related information on the cell to the PCRF.

Correspondingly, the access network device may query for subscriber information on the UE in the activated state in the cell according to the signaling for querying the UE in the activated state in the cell sent by the PCRF, and send the subscriber list information on the UE in the activated state in the cell to the PCRF; furthermore, the access network device may detect a change of the UE in the activated state changes in the cell according to signaling for detecting the change of the UE in the activated state in the cell that is sent by the PCRF, and send at least one of the following types of information to the PCRF: identification information on a UE in the activated state that changes from the deactivated state to the activated state in the cell, identification information on a UE in the activated state that changes from the activated state to the deactivated state in the cell, identification information on a UE in the activated state that leaves the cell, and identification information on the UE in the activated state that enters the cell.

Specifically, the congestion state information on the cell, the resource-related information on the cell, and the subscriber-related information on the UE in the activated state in the cell may be transmitted using current Attribute-Value Pairs (Attribute-Value Pairs, AVP for short). For example, a Congestion-Level AVP (Congestion-Level AVP) may be used for indicating the congestion state information on the cell, a Max-Requested-Bandwidth-UL/Max-Requested-Bandwidth-DL (Max-Requested-Bandwidth-UL/Max-Requested-Bandwidth-DL) may be used for indicating the maximum data service bandwidth that the cell supports, and a Subscription-Id AVP (Subscription-Id AVP) may be used for indicating UE identification information and other AVPs, or, a new AVP may be defined to transmit the subscriber-related information on the UE in the activated state in the cell, and the specific definition manners are as follows:

A Congestion_Indication AVP (Congestion_Indication AVP) is used for indicating the cell congestion and may include the cell identification information (Cell ID), or may not include the cell identification information but is sent with the cell identification in the same message.

```
Congestion_Indication :: = < AVP Header: xxxx>
    [ Cell ID ]
    *[ AVP ]
```

A CellResource_Info AVP (Cell_Resource_Info AVP) is used for indicating the resource-related information on the cell and includes a Max-Cell-Bandwidth-UL AVP (Max-Cell-Bandwidth-UL AVP) that indicates a maximum upstream bandwidth of the cell, a Max-Cell-Bandwidth-DL AVP (Max-Cell-Bandwidth-DL AVP) that indicates a maximum downstream bandwidth of the cell, and a Max-User-Number AVP (Max-User-Number AVP) that indicates the maximum number of UEs that the cell supports.

```
Cell_ Resource _Info :: = < AVP Header: xxxx>
    [ Max-Cell-Bandwidth-UL ]
    [ Max-Cell-Bandwidth-DL ]
    [ Max-User-Number ]
    *[ AVP ]
```

A User_List_In_Cell AVP (User_List_In_Cell AVP) is used for indicating the subscriber list information on the UE in the activated state in the cell, and includes one more pieces of UE identification information (Subscription-Id). For example, an international mobile subscriber identification number (International Mobile Subscriber Identification Number, IMSI for short) and a network access identifier (Network Access Identifier, NAI for short):

```
User_List_In_Cell :: = < AVP Header: xxxx>
    *[ Subscription-Id ]
    *[ AVP ]
```

A User_In AVP (User_In AVP) indicates a UE in the activated state that enters the cell, and includes the identification information on the UE in the activated state that enters the cell and the cell identification information:

```
User_In :: = < AVP Header: xxxx>
    *[ Subscription-Id ]
    [ Cell identification information ]
    *[ AVP ]
```

A User_Out AVP (User_Out AVP) indicates a UE in the activated state that leaves the cell, and includes the identification information on the UE in the activated state that leaves the cell and the cell identification information:

```
User_Out :: = < AVP Header: xxxx>
    *[ Subscription-Id ]
    [ Cell identification information ]
    *[ AVP ]
```

A User_Active AVP (User_Active AVP) indicates the UE in the activated state in the cell, and includes the identification information on the UE in the activated state in the cell and the cell identification information:

```
User_Active :: = < AVP Header: xxxx>
    *[ Subscription-Id ]
    [ Cell identification information ]
    *[ AVP ]
```

A User_Deactive AVP (User_Deactive AVP) indicates the UE in the deactivated state in the cell, and includes the identification information on the UE in the activated state in the cell and the cell identification information:

```
User_Deactive :: = < AVP Header: xxxx>
    *[ Subscription-Id ]
    [ Cell identification information ]
    *[ AVP ]
```

Specifically, the existing AVP or the newly-defined AVP may be used to transmit the congestion state information on the cell, the resource-related information on the cell, and the subscriber-related information on the UE in the activated state in the cell in, but not limited to, the following manners:

A. The congestion state information on the cell, the resource-related information on the cell, and the subscriber-related information on the UE in the activated state in the cell are transmitted in the existing messages using the existing AVPs or the newly-defined AVPs. For example, in an E-UTRAN, an S1 interface message sent by an eNB to a mobility management entity (Mobility Management Entity, MME), such as an E-RAB SETUP RESPONSE (E-RAB SETUP RESPONSE) message, an E-RAB MODIFY RESPONSE (E-RAB MODIFY RESPONSE) message, an E-RAB RELEASE RESPONSE (E-RAB RELEASE RESPONSE) message, or an E-RAB RELEASE INDICATION (E-RAB RELEASE INDICATION) message; an S11 interface message sent by the MME to an S-GW and an S5/S8 interface message sent by the S-GW to a P-GW, such as a create session request (Create Session Request) message, a bearer resource command (Bearer Resource Command) message, a modify bearer request (Modify Bearer Request) message, or a delete session request (Delete Session Request) message; and a Gx/Gxx interface message sent by the PCEF on the P-GW or the BBERF on the S-GW to the PCRF, such as a Credit-Control-Request (Credit-Control-Request, CCR for short) message or a Re-Auth-Answer (Re-Auth-Answer, RAA for short) message.

B. The congestion state information on the cell, the resource-related information on the cell, and the subscriber-related information on the UE in the activated state in the cell may be transmitted in a newly-added interface message between the access network device and the PCRF using the existing AVPs or newly-defined AVPs.

C. The congestion state information on the cell, the resource-related information on the cell, and the subscriber-related information on the UE in the activated state in the cell may be transmitted in a newly-added interface message corresponding to a newly-added operation and maintenance (Operation and Maintenance, OM for short) system between the access network device and the PCRF using the existing AVPs or newly-defined AVPs.

Furthermore, the PCRF may send the signaling for detecting the cell congestion state, signaling for querying the UE in the activated state, signaling for detecting the change of the UE in the activated state, and signaling for querying the cell to the access network device in, but not limited to, the foregoing three manners.

Furthermore, the access network device may detect the cell congestion state according to a CELL_CONGESTION (CELL_CONGESTION) event sent by the PCRF. When detecting that the cell is congested, the access network device sends the cell congestion event and cell identification information to the PCRF, so as to enable the PCRF to obtain the congestion state information on the cell according to the cell congestion event.

Correspondingly, the access network device may detect the change of the UE in the activated state in the cell and send at least one type of the following events: a USER_IN (USER_IN) event, USER_OUT (USER_OUT) event, a USER_ACTIVE (USER_ACTIVE) event, and a USER_DEACTIVE (USER_DEACTIVE) event, and a USER_DEACTIVE (USER_DEACTIVE) event, and the related UE (changed UE) identification information to the PCRF, according to the corresponding event of the UE in the activated state that changes, that is, the USE_IN event, the USER_OUT event, the USER_ACTIVE event, or the USER_DEACTIVE event.

Specifically, when the PCRF uses an event mechanism to subscribe to the congestion state information on the cell and the subscriber-related information on the UE, in the cell, that changes, the PCRF may, by extending an Event-Trigger AVP (Event-Trigger AVP) of an existing Gx/Gxx interface, add a new event such as a CELL_CONGESTION (CELL_CONGESTION) event, a USER_IN (USER_IN) event, a USER_OUT (USER_OUT) event, a USER_ACTIVE (USER_ACTIVE) event, and a USER_DEACTIVE (USER_DEACTIVE) event.

Furthermore, the subscriber-related information on the UE in the activated state in the cell may further include at least one of the following types of information: radio access technology (Radio Access Technology, RAT for short) type information and terminal type information on UEs.

In step 302, specifically, the PCRF makes the QoS policy and/or the charging policy decision to generate the QoS policy and/or the charging policy for the UE in the activated state in the cell according to the congestion state information on the cell, the resource-related information on the cell, and the subscriber-related information on the UE in the activated state in the cell.

Furthermore, in this embodiment, after step 301 is performed, the PCRF may further obtain the subscriber subscription information on the UE in the activated state in the cell according to the subscriber-related information on the UE in the activated state in the cell, in which, the subscriber subscription information may include but is not limited to at least one of the following types of information: subscriber level information, data services that subscribers are allowed to use, and the maximum data service bandwidth that subscribers are allowed to use.

Correspondingly, in step 302, the PCRF specifically generates the QoS policy and/or the charging policy for the UE in the activated state in the cell according to the congestion state information on the cell, the resource-related information on the cell, the subscriber-related information on the UE in the activated state in the cell, and the subscriber subscription information on the UE in the activated state in the cell. The PCRF sends the generated QoS policy and/or charging policy to the PCEF, and the PCEF executes the QoS policy and/or the charging policy; furthermore, the PCRF may further send the generated QoS policy to the BBERF, and the BBERF executes the QoS policy.

For example, for the QoS policy, when the congestion state information on the cell is obtained, a data service bandwidth of the UE in the activated state may be limited according to a subscriber level (gold subscriber, silver subscriber, and bronze subscriber in descending order) of the UE in the activated state and/or a data service bandwidth that the cell currently supports, or the data service used by the UE in the activated state may be further limited according to the subscriber level of the UE in the activated state and/or the data service bandwidth that the cell currently supports, or the UE activation may be further limited according to the subscriber level of the UE and/or the data service bandwidth that the cell currently supports. For example, when the number of UEs in the activated state in the cell is greater than a first threshold, the data service bandwidth of the bronze subscriber is limited; when the number of UEs in the activated state in the cell is greater than a second threshold, the data service bandwidth of the silver subscriber is limited; when the number of UEs in the activated state in the cell is greater than a third threshold, the data service bandwidth of the gold subscriber is limited; when the number of UEs in the activated state in the cell is greater than a fourth threshold, the data service of the bronze subscriber is limited; when the number of UEs in the activated state in the cell is greater than a fifth threshold, the data service of the silver subscriber is limited; when the number of UEs in the activated state in the cell is greater than a sixth threshold, the data service of the gold subscriber is limited; when the number of UEs in the activated state in the cell is greater than a seventh threshold, the activation of the bronze subscriber is limited; when the number of UEs in the activated state in the cell is greater than an eighth threshold, the activation of the silver subscriber is limited; when the number of UEs in the activated state in the cell is greater than a ninth threshold, the activation of the gold subscriber is limited. The number of UEs in the activated states in the cell may be the number of UEs in the activated states during a certain duration or the number of UEs in the activated state at a certain time; similarly, UEs of different subscriber levels may be further limited according to the data service bandwidth that the cell currently supports. For the charging policy, the data service charging standard for the UE in the activated state may be raised or lowered according to the subscriber level of the UE in the activated state (gold subscriber, silver subscriber, and bronze subscriber in a descending order). For example, when the number of UEs in the activated state is greater than the first threshold, the data service charging standard for the bronze subscriber is raised; when the number of UEs in the activated state is greater than the second threshold, the data service charging standard for the silver subscriber is raised; when the number of UEs in the activated state is greater than the third threshold, the data service charging standard for the gold subscriber is raised.

In this embodiment, by obtaining the congestion state information on the cell, the resource-related information on the cell, and the subscriber-related information on the UE in the activated state in the cell that are sent by the access network device, the PCRF can generate the QoS policy and/or the charging policy for the UE in the activated state in the cell according to the obtained information, and send the QoS policy and/or the charging policy to the PCEF, so as to enable the PCEF to execute the QoS policy and/or the charging policy, thereby implementing the control over services of all UE in the activated state in the cell. This ensures that services of the UE in the activated state in the cell normally proceed.

Figure 4:
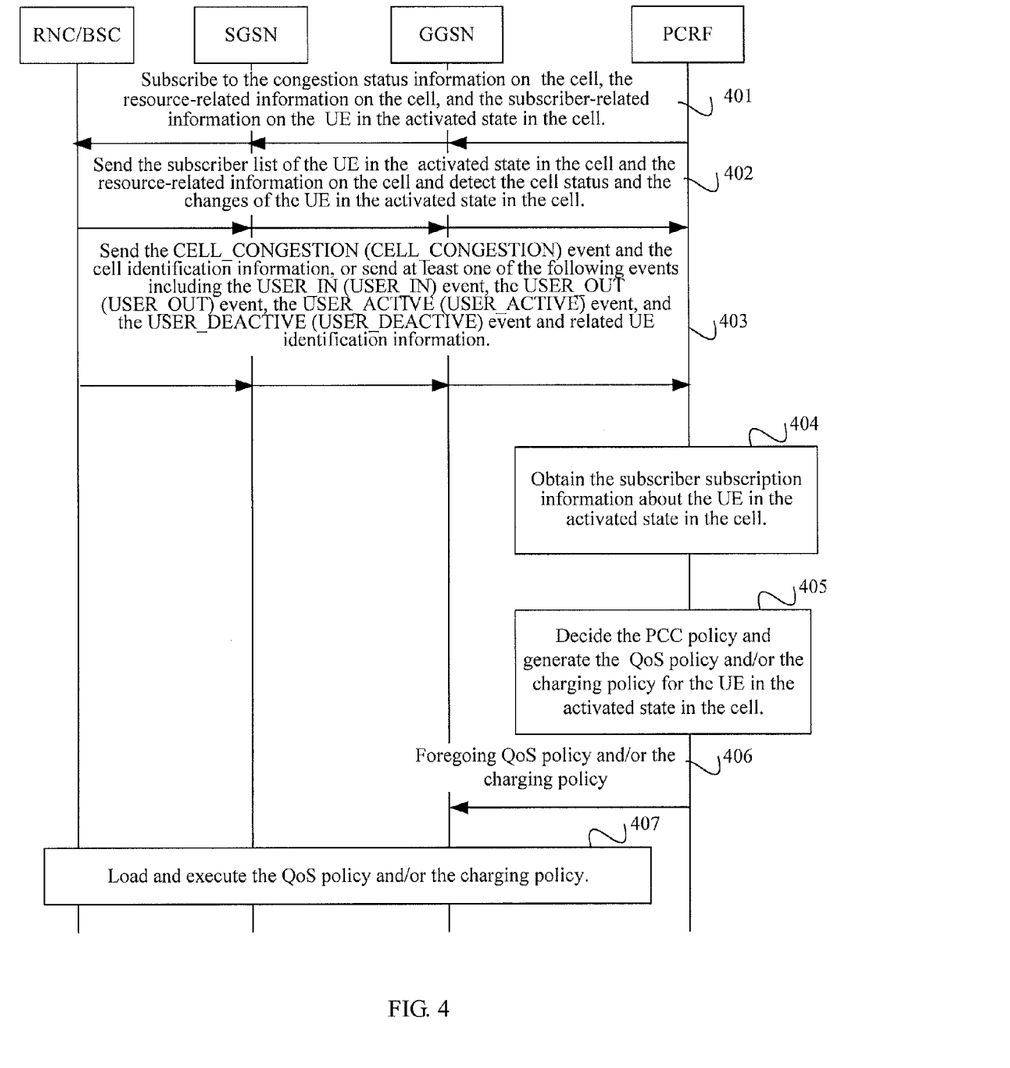
FIG. 4 is a schematic flowchart of a method for controlling services according to Embodiment 2 of the present invention.

The following describes the technical solutions of the embodiment of the present invention in detail using a UTRAN/GERAN as an example. FIG. 4 is a schematic flowchart of a method for controlling services provided in Embodiment 2 of the present invention. As shown in FIG. 4, the method for controlling services in this embodiment may include the following steps:

Step 401: A PCRF subscribes to congestion state information on a cell, resource-related information on the cell, and subscriber-related information on a UE in an activated state in the cell through a GGSN and a general packet radio service (General Packet Radio Service, GPRS for short) serving GPRS supporting node (Serving GPRS Supporting Node, SGSN for short).

The subscriber-related information on the UE in the activated state in the cell may include subscriber list information on the UE in the activated state in the cell, information on a UE in the activated state that changes from a deactivated state to the activated state in the cell, information on a UE in the activated state that changes from the activated state to the deactivated state in the cell, information on a UE in the activated state that leaves the cell, and information on a UE in the activated state that enters the cell.

A logical function of a PCEF is integrated on the GGSN.

Specifically, the PCRF may subscribe with an RNC/BSC using an existing message (including a message sent by the PCRF to the GGSN, a message sent by the GGSN to the SGSN, and a message sent by the SGSN to the RNC/BSC). The forgoing message includes an Event-Trigger AVP (Event-Trigger AVP), signaling for querying the UE in the activated state in the cell, and signaling for querying cell resources. The Event-Trigger AVP (Event-Trigger AVP) includes a CELL_CONGESTION (CELL_CONGESTION) event, a USER_IN (USER_IN) event, a USER_OUT (USER_OUT) event, a USER_ACTIVE (USER_ACTIVE) event, and a USER_DEACTIVE (USER_DEACTIVE) event.

Step 402: The RNC/BSC sends subscriber list information on the UE in the activated state in the cell and the resource-related information on the cell to the PCRF through the SGSN and GGSN according to the event included in the Event-Trigger AVP, the signaling for querying the UE in the activated state in the cell, and the signaling for querying cell resources, and detects the cell state (congested or not congested) and a change of the UE in the activated state in the cell.

Specifically, the RNC/BSC may send the subscriber list information on the UE in the activated state in the cell and the resource-related information on the cell to the PCRF using the existing message (including a message sent by the RNC/BSC to the SGSN, a message sent by the SGSN to the GGSN, and a message sent by the GGSN to the PCRF). The foregoing message includes a User_List_In_Cell AVP (User_List_In_Cell AVP) and a Cell_Resource_Info AVP (Cell_Resource_Info AVP) which respectively indicate the subscriber list information on the UE in the activated state in the cell and the resource-related information on the cell.

Step 403: When detecting that the cell is congested or the UE in the activated state in the cell changes, the RNC/BSC sends a CELL_CONGESTION (CELL_CONGESTION) event and cell identification information to the PCRF through the SGSN and GGSN, or sends at least one of the following events: the USER_IN (USER_IN) event, the USER_OUT (USER_OUT) event, the USER_ACTIVE (USER_ACTIVE) event, and the USER_DEACTIVE (USER_DEACTIVE) event, and related UE identification information.

Step 404: The PCRF obtains subscriber subscription information on the UE in the activated state in the cell according to the subscriber-related information on the UE in the activated state in the cell.

Step 405: The PCRF makes a PCC policy decision to generate a QoS policy and/or a charging policy for the UE in the activated state in the cell according to the received subscriber list information on the UE in the activated state in the cell, resource-related information on the cell, CELL_CONGESTION (CELL_CONGESTION) event, and subscriber subscription information on the UE in the activated state in the cell, or according to the received subscriber list information on the UE in the activated state in the cell, resource-related information on the cell, subscriber subscription information on the UE in the activated state in the cell, the CELL_CONGESTION (CELL_CONGESTION) event, and at least one of the following events: the USER_IN (USER_IN) event, the USER_OUT (USER_OUT) event, the USER_ACTIVE (USER_ACTIVE) event, and the USER_DEACTIVE (USER_DEACTIVE) event.

Specifically, for detailed description about the QoS policy and/or the charging policy, reference may be made to related content in Embodiment 1 of the present invention, which is not further described herein again.

Step 406: The PCRF sends the QoS policy and/or the charging policy to the GGSN.

Step 407: The GGSN loads and executes the QoS policy and/or the charging policy.

Specifically, if the QoS policy and/or the charging policy is to increase a data service bandwidth for a gold subscriber, the GGSN may initiate a modification process that is borne by the related UE in the activated state. Reference may be made to the related content in the prior art for detailed description, which is not described herein again.

In this embodiment, the PCRF subscribes to the congestion state information on the cell, the resource-related information on the cell, and the subscriber-related information on the UE in the activated state in the cell through the GGSN and SGSN with the RNC/BSC, so as to obtain the congestion state information on the cell, the resource-related information on the cell, and the subscriber-related information on the UE in the activated state in the cell that are sent by the RNC/BSC through the SGSN and GGSN, and obtains the subscriber subscription information on the UE in the activated state in the cell according to the subscriber-related information on the UE in the activated state in the cell, so that the PRCF generates the QoS policy and/or the charging policy for the UE in the activated state in the cell according to the obtained information and send the generated QoS policies and/or charging policies to the GGSN, thereby implementing the control over services of all UE in the activated state in the cell. This ensures that services of the UE in the activated state in the cell normally proceed.

Figure 5:
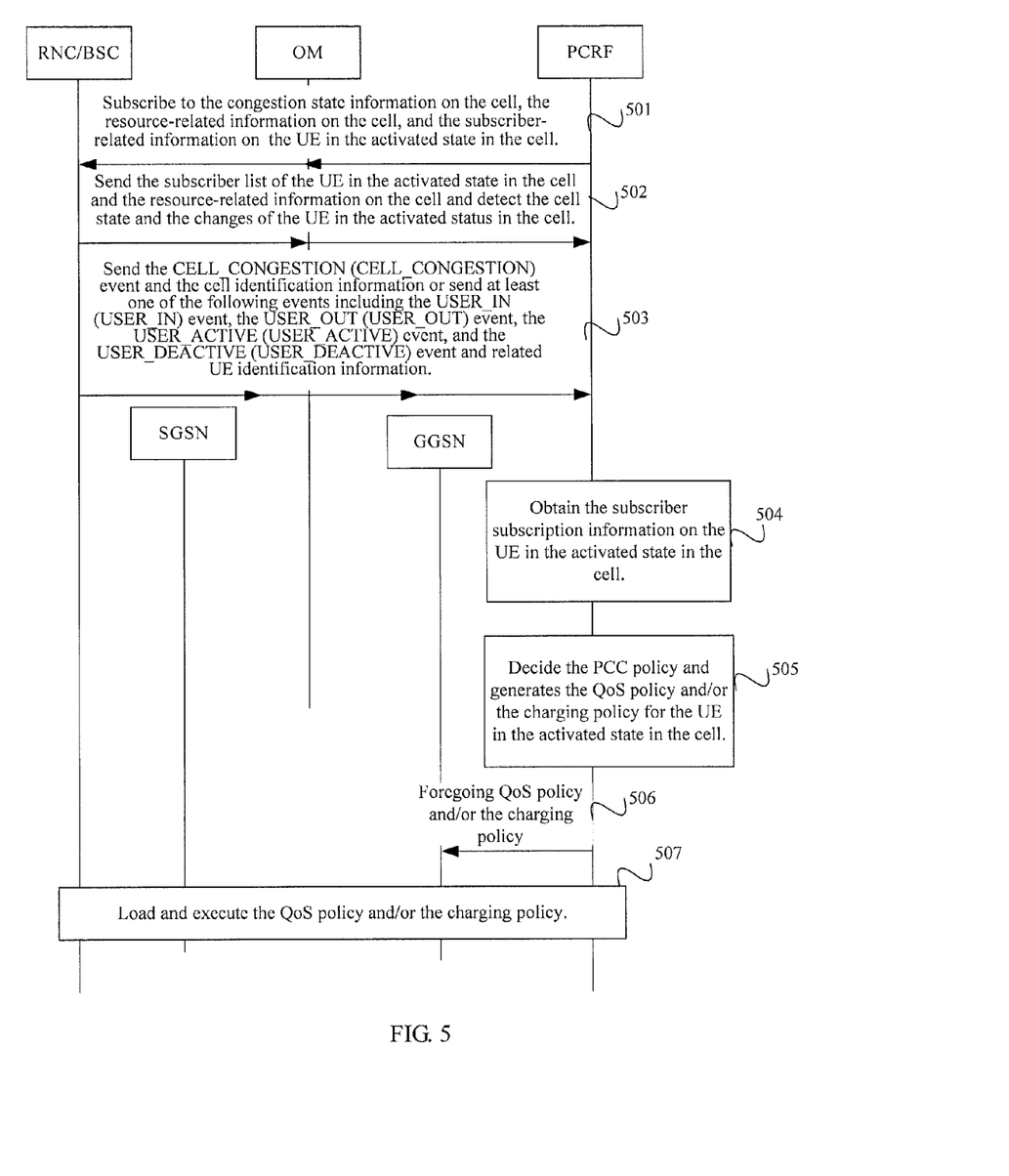
FIG. 5 is a schematic flowchart of a method for controlling services according to Embodiment 3 of the present invention.

FIG. 5 is a schematic flowchart of a method for controlling services provided in Embodiment 3 of the present invention. As shown in FIG. 5, the method for controlling services in this embodiment may include the following steps:

Step 501: A PCRF subscribes to congestion state information on a cell, resource-related information on the cell, and subscriber-related information on a UE in an activated state in the cell with an RNC/BSC through an OM system;

The subscriber-related information on the UE in the activated state in the cell may include subscriber list information on the UE in the activated state in the cell, information on a UE that changes from a deactivated state to the activated state in the cell, information on a UE in the activated state that changes from the activated state to the deactivated state in the cell, information on a UE in the activated state that leaves the cell, and information on a UE in the activated state that enters the cell.

Specifically, the PCRF may subscribe with the RNC/BSC using a newly-added interface message (including a newly-added interface message sent by the PCRF to the OM system and a newly-added interface message sent by the OM system to the RNC/BSC). The forgoing message includes an Event-Trigger AVP (Event-Trigger AVP), signaling for querying the UE in the activated state in the cell, and signaling for querying cell resources. The Event-Trigger AVP (Event-Trigger AVP) includes a CELL_CONGESTION (CELL_CONGESTION) event, a USER_IN (USER_IN) event, a USER_OUT (USER_OUT) event, a USER_ACTIVE (USER_ACTIVE) event, and a USER_DEACTIVE (USER_DEACTIVE) event.

Step 502: The RNC/BSC sends the subscriber list information on the UE in the activated state in the cell and the resource-related information on the cell to the PCRF through the OM system according to the event included in the Event-Trigger AVP, the signaling for querying the UE in the activated state in the cell, and the signaling for querying cell resources, and detects the cell state (congested or not congested) and a change of the UE in the activated state in the cell.

Specifically, the RNC/BSC may send the subscriber list information on the UE in the activated state in the cell and the resource-related information on the cell to the PCRF using the newly-added interface message (including the newly-added interface message sent by the RNC/BSC to the OM system and the newly-added interface message sent by the OM system to the PCRF). The foregoing message includes a User_List_In_Cell AVP (User_List_In_Cell AVP) and a Cell_Resource_Info AVP (Cell_Resource_Info AVP) which respectively indicate the subscriber list information on the UE in the activated state in the cell and the resource-related information on the cell.

Step 503: When detecting that the cell is congested or the UE in the activated state in the cell changes, the RNC/BSC sends a CELL_CONGESTION (CELL_CONGESTION) event and cell identification information to the PCRF through the OM system, or sends at least one of the following events: the USER_IN (USER_IN) event, the USER_OUT (USER_OUT) event, the USER_ACTIVE (USER_ACTIVE) event, and the USER_DEACTIVE (USER_DEACTIVE) event, and related UE identification information.

Step 504: The PCRF obtains subscriber subscription information on the UE in the activated state in the cell according to the subscriber-related information on the UE in the activated state in the cell.

Step 505: The PCRF makes a PCC policy decision to generate a QoS policy and/or a charging policy for the UE in the activated state in the cell according to the received subscriber list information on the UE in the activated state in the cell, the resource-related information on the cell, to CELL_CONGESTION (CELL_CONGESTION) event, and subscriber subscription information on the UE in the activated state in the cell, or according to the received subscriber list information on the UE in the activated state in the cell, resource-related information on the cell, subscriber subscription information on the UE in the activated state in the cell, the CELL_CONGESTION (CELL_CONGESTION) event, and at least one of the following events: the USER_IN (USER_IN) event, the USER_OUT (USER_OUT) event, the USER_ACTIVE (USER_ACTIVE) event, and the USER_DEACTIVE (USER_DEACTIVE) event.

Specifically, for detailed description about the QoS policy and/or the charging policy, reference may be made to related content in Embodiment 1 of the present invention, which is not further described herein again.

Step 506: The PCRF sends the QoS policy and/or the charging policy to the GGSN; the GGSN integrates with a PCEF logical function.

Step 507: The GGSN loads and executes the QoS policy and/or the charging policy.

Specifically, if the QoS policy and/or the charging policy is to increase a data service bandwidths for a gold subscriber, the GGSN may initiate a modification process that is borne by the related UE in the activated state. Reference may be made to the related content in the prior art for detailed description, which is not described herein again.

In this embodiment, the PCRF subscribes to the congestion state information on the cell, the resource-related information on the cell, and the subscriber-related information on the UE in the activated state in the cell through the OM system with the RNC/BSC, so as to obtain the congestion state information on the cell, the resource-related information on the cell, and the subscriber-related information on the UE in the activated state in the cell that are sent by the RNC/BSC through the OM system, and obtains the subscriber subscription information on the UE in the activated state in the cell according to the subscriber-related information on the UE in the activated state in the cell, so that the PRCF generates the QoS policy and/or the charging policy for the UE in the activated state in the cell according to the obtained information and send the generated QoS policies and/or charging policies to the GGSN, thereby implementing the control over services of all UE in the activated state in the cell. This ensures that services of the UE in the activated state in the cell normally proceed.

Figure 6:
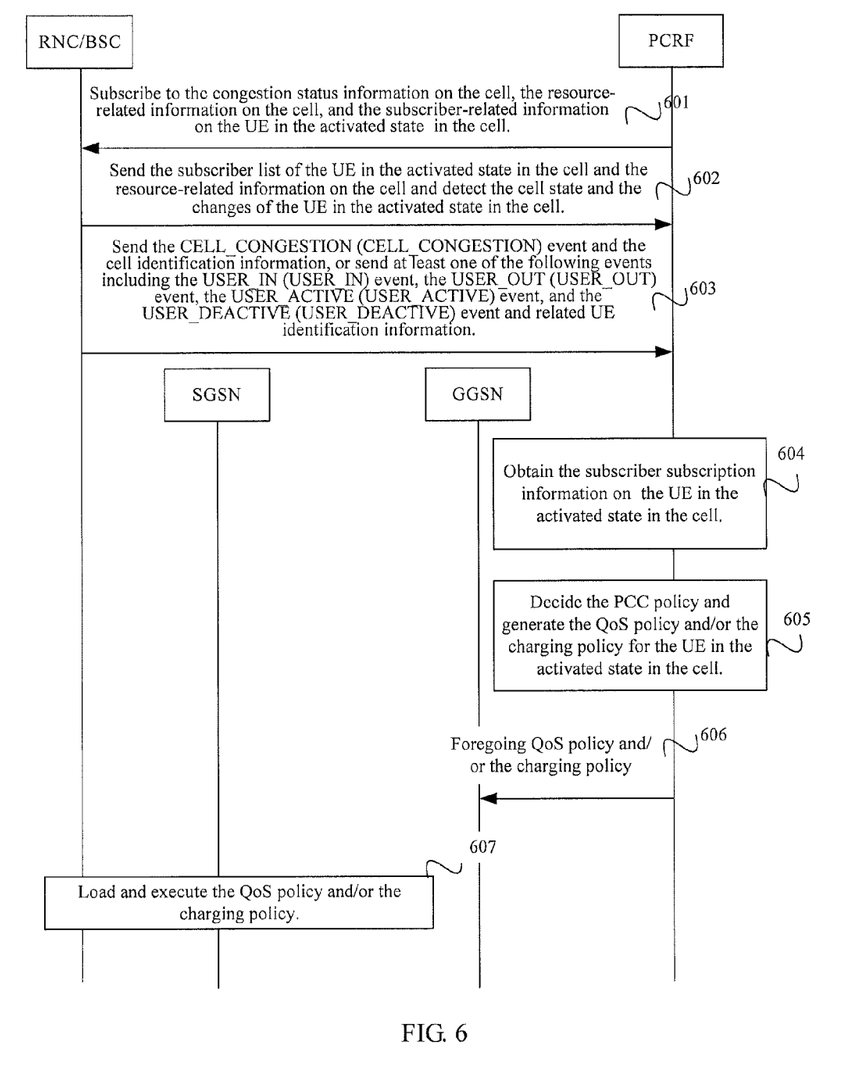
FIG. 6 is a schematic flowchart of a method for controlling services according to Embodiment 4 of the present invention.

FIG. 6 is a schematic flowchart of a method provided in Embodiment 6 of the present invention. As shown in FIG. 6, the method for controlling services in this embodiment may include the following steps:

Step 601: A PCRF subscribes to congestion state information on a cell, resource-related information on the cell, and subscriber-related information on a UE in an activated state in the cell directly with an RNC/BSC.

The subscriber-related information on the UE in the activated state in the cell may include subscriber list information on the UE in the activated state in the cell, information on a UE in the activated state that changes from a deactivated state to the activated state in the cell, information on a UE in the activated state that changes from the activated state to the deactivated state in the cell, information on a UE in the activated state that leaves the cell, and information on a UE in the activated state that enters the cell.

Specifically, the PCRF may subscribe with the RNC/BSC using a newly-added interface message. The forgoing message includes an Event-Trigger AVP (Event-Trigger AVP), signaling for querying the UE in the activated state in the cell, and signaling for querying cell resources. The Event-Trigger AVP (Event-Trigger AVP) includes a CELL_CONGESTION (CELL_CONGESTION) event, a USER_IN (USER_IN) event, a USER_OUT (USER_OUT) event, a USER_ACTIVE (USER_ACTIVE) event, and a USER_DEACTIVE (USER_DEACTIVE) event.

Step 602: The RNC/BSC directly sends subscriber list information on the UE in the activated state in the cell and the resource-related information on the cell to the PCRF according to the event included in the Event-Trigger AVP, the signaling for querying the UE in the activated state in the cell, and the signaling for querying cell resources, and detects the cell state (congested or not congested) and a change of the UE in the activated state in the cell.

Specifically, the RNC/BSC directly sends the subscriber list information on the UE in the activated state in the cell and the resource-related information on the cell to the PCRF using the newly-added interface message. The foregoing message includes a User_List_In_Cell AVP (User_List_In_Cell AVP) and a Cell_Resource_Info AVP (Cell_Resource_Info AVP) which respectively indicate the subscriber list information on the UE in the activated state in the cell and the resource-related information on the cell.

Step 603: When detecting that the cell is congested or the UE in the activated state in the cell changes, the RNC/BSC directly sends a cell congestion (CELL_CONGESTION) event and cell identification information to the PCRF, or sends at least one of the following events: the USER_IN (USER_IN) event, the USER_OUT (USER_OUT) event, the USER_ACTIVE (USER_ACTIVE) event, and the USER_DEACTIVE (USER_DEACTIVE) event, and related UE identification information.

Step 604: The PCRF obtains subscriber subscription information on the UE in the activated state in the cell according to the subscriber-related information on the UE in the activated state in the cell.

Step 605: The PCRF makes a PCC policy decision to generate a QoS policy and/or a charging policy for the UE in the activated state in the cell according to the received subscriber list information on the UE in the activated state in the cell, resource-related information on the cell, cell congestion (CELL_CONGESTION) event, and subscriber subscription information on the UE in the activated state in the cell, or according to the received subscriber list information on the UE in the activated state in the cell, resource-related information on the cell, subscriber subscription information on the UE in the activated state in the cell, the CELL_CONGESTION (CELL_CONGESTION) event, and at least one of the following events: the USER_IN (USER_IN) event, the USER_OUT (USER_OUT) event, the USER_ACTIVE (USER_ACTIVE) event, and the USER_DEACTIVE (USER_DEACTIVE) event.

Specifically, for detailed description about the QoS policy and/or the charging policy, reference may be made to related content in Embodiment 1 of the present invention, which is not further described herein again.

Step 606: The PCRF sends the QoS policy and/or the charging policy to the GGSN; the GGSN integrates with a PCEF logical function.

Step 607: The GGSN loads and executes the QoS policy and/or the charging policy.

Specifically, if the PCC QoS policy and/or the charging policy is to increase a data service bandwidth for a gold subscriber, the GGSN may initiate a modification process that is borne by the related UE in the activated state. Reference may be made to the related content in the prior art for detailed description, which is not described herein again.

In this embodiment, the PCRF directly subscribes to the congestion state information on the cell, the resource-related information on the cell, and the subscriber-related information on the UE in the activated state in the cell with the RNC/BSC, so as to obtain the congestion state information on the cell, the resource-related information on the cell, and the subscriber-related information on the UE in the activated state in the cell that are sent by the RNC/BSC, and obtains the subscriber subscription information on the UE in the activated state in the cell according to the subscriber-related information on the UE in the activated state in the cell, so that the PRCF generates the QoS policy and/or the charging policy for the UE in the activated state in the cell according to the obtained information and send the generated QoS policies and/or charging policies to the GGSN, thereby implementing the control over services of all UE in the activated state in the cell. This ensures that services of the UE in the activated state in the cell normally proceed.

It should be noted that, for ease of description, the foregoing method embodiments are expressed as a series of action combinations. However, persons skilled in the art should know that, the present invention is not confined to the described action sequences because certain steps according to the present invention may use other sequences or be implemented synchronously. It should be further understood by persons skilled in the art that the described embodiments all belong to exemplary embodiments, and the involved actions and modules are not necessarily required by the present invention.

In the foregoing embodiments, the description of each embodiment has respective focuses. For a part that is not described in detail in a certain embodiment, reference may be made to related descriptions in other embodiments.

Figure 7:
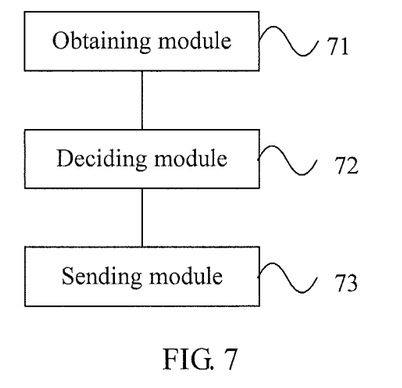
FIG. 7 is a schematic flowchart of an apparatus for controlling services according to Embodiment 5 of the present invention.

FIG. 7 is a schematic flowchart of an apparatus for controlling services provided in Embodiment 5 of the present invention. As shown in FIG. 7, the apparatus for controlling services in this embodiment may include an obtaining module 71, a decision module 72, and a sending module 73. The obtaining module 71 receives congestion state information on a cell, resource-related information on the cell, and the subscriber-related information on a UE in an activated state in the cell; the decision module 72 generates a QoS policy and/or a charging policy for the UE in the activated state in the cell according to the congestion state information on the cell, the resource-related information on the cell, and the subscriber-related information on the UE in the activated state in the cell; the sending module 73 sends the QoS policy and/or the charging policy to a PCEF, so as to enable the PCEF to execute the QoS policy and/or the charging policy.

The functions of the PCRF in Embodiments 1, 2, 3, and 4 of the present invention may all be implemented by the apparatus for controlling services provided in the embodiment of the present invention.

Furthermore, the obtaining module 71 may be further configured to obtain subscriber subscription information on the UE in the activated state in the cell according to the subscriber-related information on the UE in the activated state in the cell; correspondingly, the decision module 72 may be specifically configured to generate the QoS policy and/or the charging policy for the UE in the activated state in the cell according to the congestion state information on the cell, the resource-related information on the cell, the subscriber-related information on the UE in the activated state in the cell, and subscriber subscription information on the UE in the activated state in the cell; the sending module 73 is configured to send the QoS policy and/or the charging policy generated by the decision module 72 to the PCEF, so as to enable the PCEF to execute the QoS policy and/or the charging policy.

Furthermore, if a bearer binding and event reporting function entity (Bearer Binding and Event Reporting Function, BBERF for short) exists in a network, the sending module 73 may further send the QoS policy to the BBERF, so as to enable the BBERF to execute the QoS policy.

Furthermore, in this embodiment, the obtaining module 71 may be further configured to:

send signaling for detecting a cell congestion state, through the PCEF or an OM system or directly to an access network device, to instruct the access network device to detect and send the cell congestion state; receive cell congestion indication information sent through the PCEF or the OM system or directly by the access network device when the access network device detects that the cell is congested; and obtain the congestion state information on the cell according to the cell congestion indication information; or send the cell congestion event through the PCEF or an OM system or directly to the access network device, to instruct the access network device to send the cell congestion state when the access network device detects a cell congestion event of the cell; receive a cell congestion event and cell identification information that are sent through the PCEF or the OM system or directly by the access network device when the access network device detects that the cell is congested; and obtain the congestion state information on the cell according to the cell congestion event.

Furthermore, in this embodiment, the obtaining module 71 may be further configured to:

send signaling for querying cell resources, through the PCEF or the OM system or directly to the access network device; and receive the resource-related information on the cell that is sent through the PCEF or the OM system or directly by the access network device.

Specifically, the subscriber-related information on the UE in the activated state in the cell in this embodiment may include subscriber list information on the UE in the activated state in the cell, or the subscriber-related information on the UE in the activated state in the cell may further include the subscriber list information on the UE in the activated state in the cell and change information on the UE in the activated state in the cell. Furthermore, the obtaining module 71 in this embodiment may be further configured to send the signaling for querying the UE in the activated state in the cell, through the PCEF or the OM system or directly to the access network device, to instruct the access network device to query for the subscriber information on the UE in the activated state in the cell; and receive the subscriber list information on the UE in the activated state in the cell, sent through the PCEF or the OM system or directly by the access network device. Furthermore, in this embodiment, the obtaining module 71 may be further configured to:

send signaling for detecting a change of the UE in the activated state in the cell through the PCEF or the OM system or directly to the access network device, to instruct the access network device to send the information on the UE in the activated state that changes when the access network device detects that the UE in the activated state in the cell changes; and receive at least one type of the following information sent through the PCEF or the OM system or directly, by the access network device: identification information on a UE in the activated state that changes from a deactivated state to the activated state, identification information on a UE in the deactivated state that changes from the activated state to the deactivated state, identification information on a UE in the activated state that leaves the cell, and identification information on a UE in the activated state that enters the cell; or send at least one type of the following events through the PCEF or the OM system or directly to the access network device: a USER_IN event, a USER_OUT event, a USER_ACTIVE event, and a USER_DEACTIVE event, to instruct the access network device to send the information on the UE in the activated state that changes when the access network device detects at least one type of the following events of the UE in the activated state in the cell: the USER_IN event, the USER_OUT event, the USER_ACTIVE event, and the USER_DEACTIVE event; and receive at least one type of the following events: the USER_IN event, the USER_OUT event, the USER_ACTIVE event, and the USER_DEACTIVE event, and related UE identification information that are sent through the PCEF or the OM system or directly by the access network device.

In this embodiment, the obtaining module obtains the congestion state information on the cell, the resource-related information on the cell, and the subscriber-related information on the UE in the activated state in the cell that are sent by the access network device, and the second obtaining module obtains the subscriber subscription information on the UE in the activated state in the cell, so that the decision module is enabled to, according to the forgoing information obtained by the obtaining module, generate the QoS policy and/or the charging policy for the UE in the activated state, and the sending module sends the QoS policy and/or the charging policy to the PCEF, or sends the QoS policy and/or the charging policy to the PCEF and send the QoS policy to the BBERF, thereby implementing the control over services of all the UEs in the activated state in the cell. This ensures that services of the UE in the activated state in the cell normally proceed.

Figure 8:
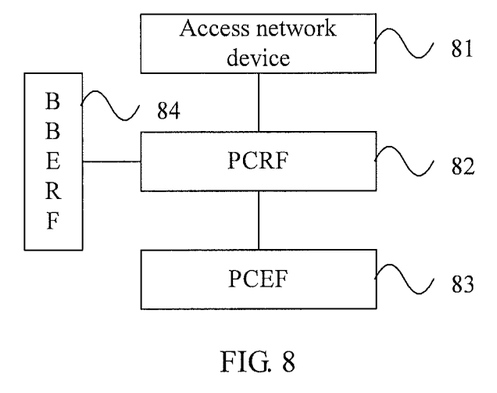
FIG. 8 is a schematic flowchart of a system for controlling services according to Embodiment 6 of the present invention.

FIG. 8 is a schematic flowchart of a system for controlling services provided in Embodiment 6 of the present invention. As shown in FIG. 8, the system for controlling services in this embodiment may include an access network device 81 and a PCRF 82, where:

the access network device 81 is configured to send congestion state information on a cell, resource-related information on the cell, and subscriber-related information on a UE in an activated state in the cell to the PCRF 82; and the PCRF 82 is configured to receive the congestion state information on the cell, the resource-related information on the cell, and the subscriber-related information on the UE in the activated state in the cell that are sent by the access network device 81; generate a QoS policy and/or charging policy for the UE in the activated state in the cell according to the congestion state information on the cell, the resource-related information on the cell, and the subscriber-related information on the UE in the activated state in the cell; and send the generated QoS policy and/or charging policy to a PCEF, so as to enable the PCEF to execute the QoS policy and/or the charging policy sent by the PCRF 82.

In another embodiment of the present invention, the system for controlling services may further include a PCEF 83, where the PCEF 83 is configured to receive and execute the QoS policy and/or the charging policy sent by the PCRF 82.

Furthermore, the PCRF 82 may be further configured to:
obtain subscriber subscription information on the UE in the activated state in the cell according to the subscriber-related information on the UE in the activated state in the cell; generate the QoS policy and/or the charging policy for the UE in the activated state in the cell according to the congestion state information on the cell, the resource-related information on the cell, the subscriber-related information on the UE in the activated state in the cell, and subscriber subscription information on the UE in the activated state in the cell; and send the generated QoS policy and/or charging policy to the PCEF 83;

correspondingly, the PCEF 83 may be further configured to execute the QoS policy and/or the charging policy sent by the PCRF 82.

Furthermore, the system for controlling services provided in this embodiment may further include a BBERF 84; the PCRF 82 may further send the QoS policy to the BBERF 84; correspondingly, the BBERF 84 may be further configured to receive and execute the QoS policy sent by the PCRF 82.

In this embodiment, by obtaining the congestion state information on the cell, the resource-related information on the cell that are sent by the access network device, and the subscriber-related information on the UE in the activated state in the cell, the PCRF can generate the QoS policy and/or the charging policy for the UE in the activated state in the cell according to the obtained information and send the QoS policy and/or the charging policy to the PCEF, so as to enable the PCEF to execute the QoS policy and/or the charging policy, thereby implementing the control over services of all the UEs in the activated state in the cell. This ensures that services of the UE in the activated state in the cell normally proceed.

Persons of ordinary skill in the art should understand that, all or part of the steps of the foregoing method embodiments may be implemented by a program instructing relevant hardware. The foregoing program may be stored in a computer readable storage medium. When the program runs, the preceding steps included in the method embodiments are performed. The foregoing storage medium may be any medium capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solution described in the foregoing embodiments or make equivalent replacements to some technical features thereof without departing from the spirit and scope of the technical solution of the embodiments of the present invention.

What is claimed is:

1. A method for controlling services, comprising:
   obtaining, by a policy control and charging rules function (PCRF) entity, congestion state information of a cell, resource-related information of the cell, and subscriber-related information of a user equipment (UE) in an activated state in the cell that are sent by an access network device;
   generating, by the PCRF entity, a policy for quality of service (QoS) and/or charging for the UE in the cell according to the congestion state information of the cell, the resource-related information of the cell, and the subscriber-related information of the UE in the cell; and sending, by the PCRF entity, the policy to a policy and charging enforcement function (PCEF) entity so as to enable the PCEF to execute the policy for QoS and/or charging for the cell.

2. The method according to claim 1, wherein the method further comprises:
   obtaining, by the PCRF entity, subscriber subscription information of the UE in the cell according to the subscriber-related information of the UE in the cell; and
   the generating comprises:
   generating, by the PCRF entity, the policy for the UE in the cell, according to the congestion state information of the cell, the resource-related information of the cell, the subscriber-related information of the UE in the cell, and the subscriber subscription information of the UE in the cell.

3. The method according to claim 1, further comprising:
   sending, by the PCRF entity, the policy to a bearer binding and event reporting function (BBERF) entity so as to enable the BBERF to execute the policy.

4. The method according to claim 1, further comprising:
   sending, by the PCRF entity, signaling for detecting a cell congestion state, through the PCEF entity or an operation and maintenance (OM) system or directly to the access network device, to instruct the access network device to detect and send the cell congestion state;
   wherein the obtaining of the congestion state information of the cell comprises:
   receiving, by the PCRF entity, cell congestion indication information of the cell that is sent through the PCEF entity or the OM system or directly by the access network device when the access network device detects that the cell is congested,
   obtaining the congestion state information of the cell according to the cell congestion indication information.

5. The method according to claim 1, further comprising:
   sending, by the PCRF entity, a cell congestion event, through the PCEF entity or an OM system or directly to the access network device, to instruct the access network device to send the cell congestion state when the access network device detects a cell congestion event of the cell;
   the obtaining of the congestion state information of the cell comprises:
   receiving, by the PCRF entity, a cell congestion event and cell identification information that are sent through the PCEF entity or the OM system or directly by the access network device when the access network device detects the cell is congested, and obtaining, by the PCRF entity, the congestion state information of the cell according to the cell congestion event.

6. The method according to claim 1, wherein execution of the policy for QoS and/or charging for the cell by the PCEF entity allows control over services of all UEs in the cell.

7. The method according to claim 1, wherein the subscriber-related information of the UE in the cell comprises identification information of a UE that enters the cell.

8. An apparatus for controlling services, comprising:
   a non-transitory memory storage including instructions; and
   one or more processors to execute the instructions to perform the following:
   obtaining congestion state information of a cell, resource-related information of the cell, and subscriber-related information of a user equipment (UE) in an activated state in the cell that are sent by an access network device;

generating a policy for quality of service (QoS) and/or charging for the UE in the cell according to the congestion state information of the cell, the resource-related information of the cell, and the subscriber-related information of the UE in the cell; and sending the policy to a policy and charging enforcement function (PCEF) entity so as to enable the PCEF to execute the policy for QoS and/or charging for the cell.

9. The apparatus according to claim 8, wherein subscriber subscription information of the UE in the cell is obtained according to the subscriber-related information of the UE in the cell; and the policy for the UE in the cell is generated according to the congestion state information of the cell, the resource-related information of the cell, the subscriber-related information of the UE in the cell, and the subscriber subscription information of the UE in the cell.

10. The apparatus according to claim 8, wherein the policy is sent to a bearer binding and event reporting function (BBERF) entity so as to enable the BBERF to execute the policy.

11. The apparatus according to claim 8, wherein:

signaling for detecting a cell congestion state is sent, through the PCEF entity or an operation and maintenance (OM) system or directly to the access network device, to instruct the access network device to detect and send the cell congestion state;

cell congestion indication information of the cell sent through the PCEF or the OM system or directly by the access network device is received when the access network device detects that the cell is congested; and the congestion state information of the cell is obtained according to the cell congestion indication information.

12. The apparatus according to claim 8, wherein a cell congestion event is sent through the PCEF or the OM system or directly to the access network device, to instruct the access network device to send the cell congestion state when the access network device detects a cell congestion event of the cell;

a cell congestion event and cell identification information that are sent through the PCEF or the OM system or directly by the access network device are received when the access network device detects that the cell is congested;

the congestion state information on the cell is obtained according to the cell congestion event.

13. The apparatus according to claim 8, wherein execution of the policy for QoS and/or charging for the cell by the PCEF entity allows control over services of all UEs in the cell.

14. The apparatus according to claim 8, wherein the subscriber-related information of the UE in the cell comprises identification information of a UE that enters the cell.

15. A system for controlling services, comprising:

an access network device configured to send congestion state information of a cell, resource-related information of the cell, and subscriber-related information of a UE in an activated state in the cell; and a policy and charging rules function (PCRF) entity configured to: receive the congestion state information of the cell, the resource-related information of the cell, and the subscriber-related information of the UE in the cell that are sent by the access network device;

generate a policy for quality of service (QoS) and/or charging for the UE in the cell according to the congestion state information of the cell, the resource-related information of the cell, and the subscriber-related information of the UE in the cell; and send the generated policy to a policy and charging enforcement function PCEF so as to enable the PCEF to execute the policy for QoS and/or charging for the cell.

* * * * *